United States Patent
Reial et al.

(10) Patent No.: US 12,289,788 B2
(45) Date of Patent: Apr. 29, 2025

(54) ADAPTATION OF ACTIVE-TIME PDCCH MONITORING USING SHORT DISCONTINUOUS RECEPTION (DRX)

(71) Applicant: Telefonaktiebolaget LM Ericsson (publ), Stockholm (SE)

(72) Inventors: Andres Reial, Lomma (SE); Ilmiawan Shubhi, Malmö (SE); Pramod Jacob Mathecken, Lomma (SE); Sina Maleki, Malmö (SE); Ali Nader, Malmö (SE); Martin Van Der Zee, Malmö (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 420 days.

(21) Appl. No.: 17/620,387

(22) PCT Filed: Jun. 18, 2020

(86) PCT No.: PCT/EP2020/066899
§ 371 (c)(1),
(2) Date: Dec. 17, 2021

(87) PCT Pub. No.: WO2020/254475
PCT Pub. Date: Dec. 24, 2020

(65) Prior Publication Data
US 2022/0256643 A1    Aug. 11, 2022

Related U.S. Application Data

(60) Provisional application No. 62/863,111, filed on Jun. 18, 2019.

(51) Int. Cl.
*H04W 76/28*     (2018.01)
*H04W 72/23*     (2023.01)

(52) U.S. Cl.
CPC ........... *H04W 76/28* (2018.02); *H04W 72/23* (2023.01)

(58) Field of Classification Search
CPC ............................. H04W 76/28; H04W 72/23
See application file for complete search history.

(56) References Cited

U.S. PATENT DOCUMENTS 11,528,668 B2 * 12/2022 Deenoo ............. H04W 52/0216
2008/0101268 A1   5/2008 Sammour et al.
(Continued)

FOREIGN PATENT DOCUMENTS

| WO | 2013044415 A1 | 4/2013 |
| WO | 2014198480 A1 | 12/2014 |
| WO | 2016064048 A1 | 4/2016 |

OTHER PUBLICATIONS

International Search Report and Written Opinion dated Aug. 17, 2020 for International Application No. PCT/EP2020/066899 filed Jun. 18, 2020, consisting of 14-pages.

*Primary Examiner* — Blake J Rubin
(74) *Attorney, Agent, or Firm* — Weisberg I.P. Law, P.A.

(57) ABSTRACT

A method, system, network node and wireless device are disclosed. In one or more embodiments, A network node configured to communicate with a wireless device is provided. The network node includes processing circuitry configured to: determine a short DRX configuration based at least on a delay value constraint associated with the wireless device, and transmit an indication of the short DRX configuration and a long DRX configuration where the short DRX configuration corresponds to a shorter cycle length than a cycle length of the long DRX configuration.

21 Claims, 9 Drawing Sheets

(56) References Cited

U.S. PATENT DOCUMENTS

| | | | |
|---|---|---|---|
| 2015/0092647 A1* | 4/2015 | Tabet | H04W 28/0221 |
| | | | 370/311 |
| 2015/0131504 A1* | 5/2015 | Lin | H04W 52/0225 |
| | | | 370/311 |
| 2015/0201375 A1* | 7/2015 | Vannithamby | H04W 48/14 |
| | | | 370/311 |
| 2015/0341858 A1* | 11/2015 | Hwang | H04L 1/1854 |
| | | | 370/311 |
| 2016/0128128 A1* | 5/2016 | Ang | H04W 76/28 |
| | | | 370/311 |
| 2016/0234780 A1* | 8/2016 | Chakrapani | H04W 52/02 |
| 2018/0014322 A1* | 1/2018 | Loehr | H04W 28/0278 |
| 2020/0037396 A1* | 1/2020 | Islam | H04W 52/0229 |
| 2020/0204291 A1* | 6/2020 | Awoniyi-Oteri | H04W 72/20 |
| 2020/0229093 A1* | 7/2020 | Ahmad | H04W 52/0209 |
| 2020/0236692 A1* | 7/2020 | Lin | H04W 72/535 |
| 2020/0245395 A1* | 7/2020 | Zhang | H04W 76/19 |
| 2022/0007290 A1* | 1/2022 | You | H04W 76/28 |
| 2022/0132341 A1* | 4/2022 | Lee | H04W 24/08 |
| 2022/0191793 A1* | 6/2022 | Murray | H04W 72/23 |
| 2022/0217636 A1* | 7/2022 | Shrivastava | H04L 5/0055 |
| 2022/0217790 A1* | 7/2022 | Qiu | H04B 7/2041 |
| 2022/0264616 A1* | 8/2022 | Shah | H04W 72/1273 |
| 2022/0279442 A1* | 9/2022 | Luo | H04W 76/28 |
| 2022/0303901 A1* | 9/2022 | Yang | H04W 52/0232 |
| 2022/0361283 A1* | 11/2022 | Liu | H04W 52/0235 |
| 2023/0014303 A1* | 1/2023 | Di Girolamo | H04W 72/20 |
| 2023/0217506 A1* | 7/2023 | Löhr | H04W 74/006 |
| | | | 370/329 |

* cited by examiner

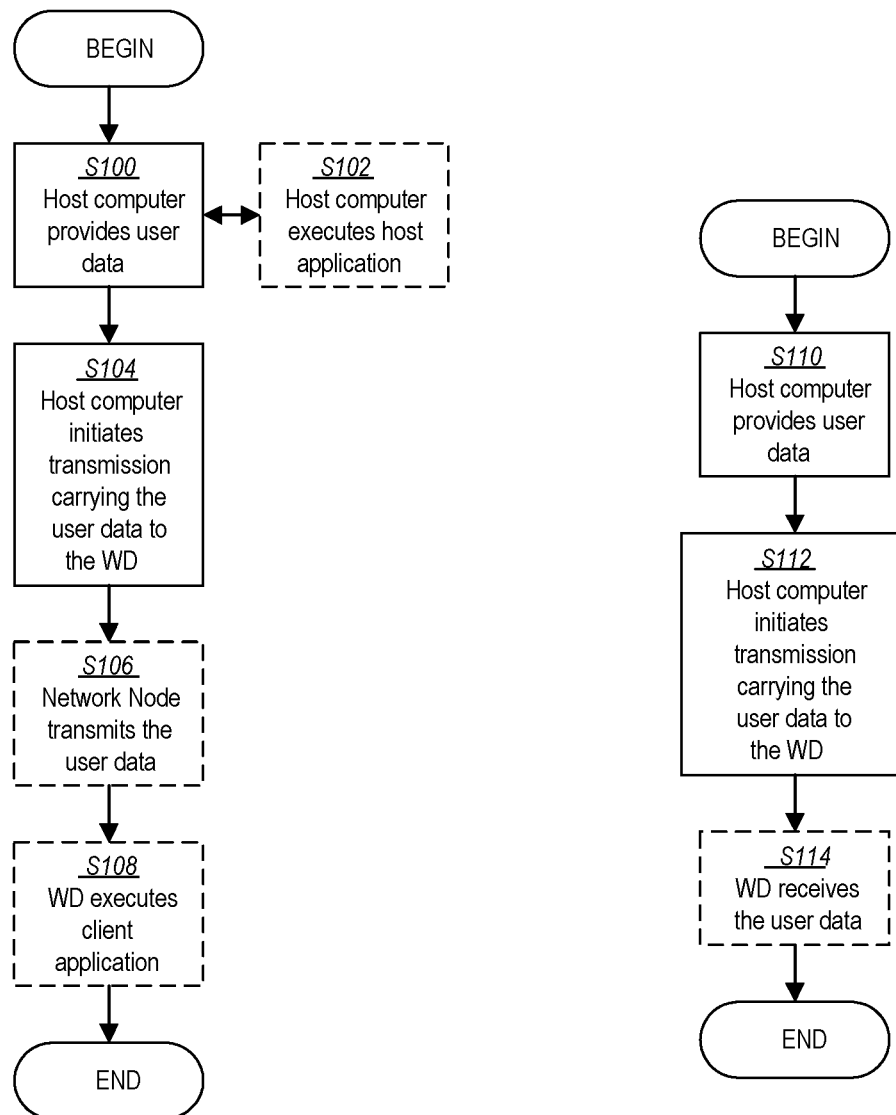

ADAPTATION OF ACTIVE-TIME PDCCH MONITORING USING SHORT DISCONTINUOUS RECEPTION (DRX)

CROSS-REFERENCE TO RELATED APPLICATIONS

This application is a Submission Under 35 U.S.C. § 371 for U.S. National Stage Patent Application of International Application No.: PCT/EP2020/066899, filed Jun. 18, 2020 entitled "ADAPTATION OF ACTIVE-TIME PDCCH MONITORING USING SHORT DISCONTINUOUS RECEPTION (DRX)," which claims priority to U.S. Provisional Application No. 62/863,111, filed Jun. 18, 2019, entitled "ADAPTATION OF ACTIVE-TIME PDCCH MONITORING USING SHORT DISCONTINUOUS RECEPTION (DRX)," the entireties of both of which are incorporated herein by reference.

TECHNICAL FIELD

Wireless communication and in particular, in particular, to adaptation of channel monitoring by short discontinuous reception (DRX).

BACKGROUND

Discontinuous reception (DRX) in Radio Resource Control (RRC) connected mode communications may be referred to as C-DRX. FIG. 1 is a block diagram of an example of Third Generation Partnership Project (3GPP) defined behavior of a wireless device (WD) configured to operate in C-DRX mode. In brief (some details such as retransmission timers are left out), a C-DRX (interchangeably referred to as cDRX herein) configuration informs the wireless device that it may only need to monitor the Physical Downlink Control Channel (PDCCH, also referred to as the Physical Downlink Common Control Channel) for potential Downlink Control Information (DCI) candidates during certain periods called On-Duration periods. If there are any Physical Downlink Shared Channel (PDSCH)/Physical Uplink Shared Channel (PUSCH) allocations for the wireless device in the DCIs, the wireless device logically enters into a constantly monitoring mode during which time an Inactivity Timer is running. Upon expiry of the inactivity timer, the wireless device logically enters back to DRX operation, where the wireless device wakes up during On-Duration periods.

Optionally, the network node may configure the wireless device with two DRX cycle sets where one DRX cycle set has short DRX cycles and one DRX cycle set has long DRX cycles. The wireless device may transition through short DRX cycle periods to long DRX cycle periods. One assumption associated with this scheme is that after a wireless device activity, there is a high probability that the wireless device may need to communicate with a node and/or another wireless device within a short time, but the probability reduces as time passes.

In 3GPP Release 15 there may be only one configuration for the On-Durations. Furthermore, throughout the entire RRC connected state operating in a bandwidth part (BWP), the wireless device may monitor the PDCCH according to one CORESET/Search space configuration (referred to as search space). The search space configuration may be applicable to all the monitoring occasions depicted in FIG. 1 by boxes filled with diagonal pattern.

However, energy consumed during the monitoring operations of the wireless device remains the dominate contributor to extra energy consumption by the wireless device. Therefore, more efficient monitoring processes may be needed.

SUMMARY

Some embodiments advantageously provide methods, systems, and apparatuses for adaptation of channel monitoring by short discontinuous reception (DRX).

In one or more embodiments, to achieve dynamic switching between dense and sparse PDCCH monitoring, the network node may configure a wireless device with short DRX cycle at a small-time scale (i.e., predefined time scale), in addition to the conventional long DRX cycle. The short DRX, to be activated between data bursts in active time, has a short period (e.g., a few ms), short IAT (i.e., DRX inactivity timer) from a last data slot (e.g. 0 or 1), and number of periods (or timer duration) before entering long DRX is chosen such that conventional IAT length is equal to the shortened IAT length plus the number of periods of the short DRX. The long DRX is configured with a long period (e.g., 100s of ms) and a release timer before transitioning to idle/inactive mode may be used as in the conventional cDRX.

In 3GPP Release 15 (Rel-15), the on-durations of the short and long DRX have equal lengths. The on-duration length may be selected to be short enough to allow a low monitoring duty cycle in short DRX based at least in part on the wireless device's acceptable data delay, and long enough to allow sufficient scheduling flexibility during long DRX on-durations. If no such compromise duration value is available, the network node may choose not to configure the wireless device with short DRX.

In other scenarios, e.g., future NR releases, on-durations may be selected independently, in which case the short DRX on-duration length may be selected shorter, possibly as low as one slot, in order to allow shorter periods with low duty cycle.

According to one aspect of the disclosure, a network node configured to communicate with a wireless device is provided. The network node includes processing circuitry configured to: determine a short DRX configuration based at least on a delay value constraint associated with the wireless device, and transmit an indication of the short DRX configuration and a long DRX configuration where the short DRX configuration corresponds to a shorter cycle length than a cycle length of the long DRX configuration.

According to one or more embodiments of this aspect, the delay value constraint is based at least on at least one of: capability signaling associated with the wireless device; traffic type; downlink/uplink buffer; and delay in signaling. According to one or more embodiments of this aspect, the short DRX configuration is based at least on an on-duration length constraint where the on-duration length constraint is based on a capability signaling associated with the wireless device. According to one or more embodiments of this aspect, the on-duration length constraint is based at least on one of a monitoring duty cycle and scheduling flexibility.

According to one or more embodiments of this aspect, the short DRX configuration is configured to occur after a data burst and during an inactivity timer phase of the long DRX configuration. According to one or more embodiments of this aspect, an on-duration length of the short DRX configuration is configured to correspond to an on-duration length of the long DRX configuration where the short DRX configuration results in sparce monitoring compared to the long DRX configuration. According to one or more embodiments of this aspect, an on-duration length of the short DRX configuration is configured to be shorter than an on-duration length of the long DRX configuration.

According to one or more embodiments of this aspect, an inactivity time for the short DRX configuration is shorter than an inactivity time for the long DRX configuration. According to one or more embodiments of this aspect, the processing circuitry is further configured to: determine that the wireless device missed at least one physical downlink control channel scheduling; and retransmit physical downlink control channel scheduling in at least one on-duration of the short DRX configuration.

According to another aspect of the disclosure, a wireless device that is configured to communicate with a network node is provided. The wireless device includes processing circuitry configured to: optionally receive a short DRX configuration and a long DRX configuration; and implement the short DRX configuration and the long DRX configuration, the short DRX configuration being based at least on a delay value constraint associated with the wireless device and corresponding to a shorter cycle length than a cycle length of the long DRX configuration.

According to one or more embodiments of this aspect, the delay value constraint is based at least on at least one of: capability signaling associated with the wireless device; traffic type; downlink/uplink buffer; and delay in signaling. According to one or more embodiments of this aspect, the short DRX configuration is based at least on an on-duration length constraint, the on-duration length constraint being based on a capability signaling associated with the wireless device. According to one or more embodiments of this aspect, the on-duration length constraint is based at least on one of a monitoring duty cycle and scheduling flexibility.

According to one or more embodiments of this aspect, the processing circuitry is further configured to cause transmission of one of: capability signaling to the network node via radio resource control, RRC, signaling; and assistance information related to ongoing one of traffic and services. According to one or more embodiments of this aspect, a short DRX phase of the short DRX configuration is configured to occur after a data burst and during an inactivity timer phase of the long DRX configuration. According to one or more embodiments of this aspect, an on-duration length of the short DRX configuration is configured to correspond to an on-duration length of the long DRX configuration where the short DRX configuration results in sparce monitoring compared to the long DRX configuration.

According to one or more embodiments of this aspect, an on-duration length of the short DRX configuration is configured to be shorter than an on-duration length of the long DRX configuration. According to one or more embodiments of this aspect, an inactivity time for the short DRX configuration is shorter than an inactivity time for the long DRX configuration. According to one or more embodiments of this aspect, the processing circuitry is further configured to: enter a short DRX phase of the short DRX configuration based at least on a missed physical downlink control channel scheduling; and receive a retransmission of a physical downlink control channel scheduling in at least one on-duration of the short DRX configuration.

According to another aspect of the disclosure, a method implemented by a network node that is configured to communicate with a wireless device is provided. A short DRX configuration is determined based at least on a delay value constraint associated with the wireless device. An indication of the short DRX configuration and a long DRX configuration is transmitted. The short DRX configuration corresponds to a shorter cycle length than a cycle length of the long DRX configuration.

According to one or more embodiments of this aspect, the delay value constraint is based at least on at least one of: capability signaling associated with the wireless device; traffic type; downlink/uplink buffer; and delay in signaling. According to one or more embodiments of this aspect, the short DRX configuration is based at least on an on-duration length constraint, the on-duration length constraint being based on a capability signaling associated with the wireless device. According to one or more embodiments of this aspect, the on-duration length constraint is based at least on one of a monitoring duty cycle and scheduling flexibility.

According to one or more embodiments of this aspect, the short DRX configuration is configured to occur after a data burst and during an inactivity timer phase of the long DRX configuration. According to one or more embodiments of this aspect, an on-duration length of the short DRX configuration is configured to correspond to an on-duration length of the long DRX configuration, the short DRX configuration resulting in sparce monitoring compared to the long DRX configuration. According to one or more embodiments of this aspect, an on-duration length of the short DRX configuration is configured to be shorter than an on-duration length of the long DRX configuration.

According to one or more embodiments of this aspect, an inactivity time for the short DRX configuration is shorter than an inactivity time for the long DRX configuration. According to one or more embodiments of this aspect, the wireless device is determined to have missed at least one physical downlink control channel scheduling, and physical downlink control channel scheduling is retransmitted in at least one on-duration of the short DRX configuration.

According to another aspect of the disclosure, a method implemented by a wireless device that is configured to communicate with a network node is provided. A short DRX configuration and a long DRX configuration is optionally received. The short DRX configuration and the long DRX configuration are implemented where the short DRX configuration is based at least on a delay value constraint associated with the wireless device and corresponding to a shorter cycle length than a cycle length of the long DRX configuration.

According to one or more embodiments of this aspect, the delay value constraint is based at least on at least one of: capability signaling associated with the wireless device; traffic type; downlink/uplink buffer; and delay in signaling. According to one or more embodiments of this aspect, the short DRX configuration is based at least on an on-duration length constraint, the on-duration length constraint being based on a capability signaling associated with the wireless device. According to one or more embodiments of this aspect, the on-duration length constraint is based at least on one of a monitoring duty cycle and scheduling flexibility.

According to one or more embodiments of this aspect, transmission is caused of one of: capability signaling to the network node via radio resource control, RRC, signaling; and assistance information related to ongoing one of traffic and services. According to one or more embodiments of this aspect, a short DRX phase of the short DRX configuration is configured to occur after a data burst and during an inactivity timer phase of the long DRX configuration. According to one or more embodiments of this aspect, an on-duration length of the short DRX configuration is configured to correspond to an on-duration length of the long DRX configuration where the short DRX configuration results in sparce monitoring compared to the long DRX configuration.

According to one or more embodiments of this aspect, an on-duration length of the short DRX configuration is configured to be shorter than an on-duration length of the long DRX configuration. According to one or more embodiments of this aspect, an inactivity time for the short DRX configuration is shorter than an inactivity time for the long DRX configuration. According to one or more embodiments of this aspect, a short DRX phase of the short DRX configuration is entered based at least on a missed physical downlink control channel scheduling, and a retransmission of a physical downlink control channel scheduling is received in at least one on-duration of the short DRX configuration.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 4 is a flowchart illustrating exemplary methods implemented in a communication system including a host computer, a network node and a wireless device for executing a client application at a wireless device according to some embodiments of the present disclosure;

FIG. 5 is a flowchart illustrating exemplary methods implemented in a communication system including a host computer, a network node and a wireless device for receiving user data at a wireless device according to some embodiments of the present disclosure;

DETAILED DESCRIPTION

Figure 1:
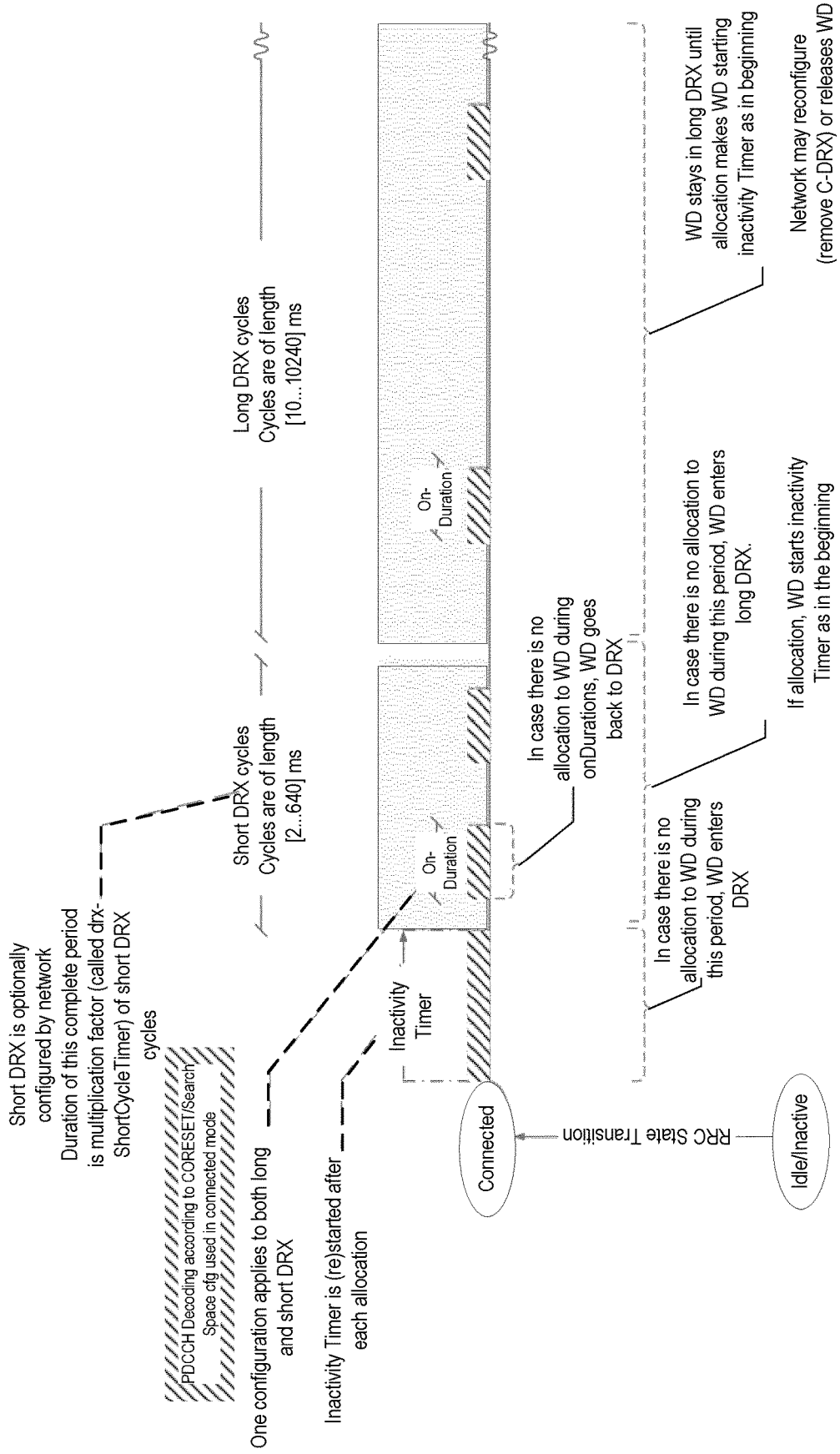
FIG. 1 is a block diagram of a DRX configuration.

During the active time of connected mode DRX (cDRX), when the DRX Inactivity Timer (IAT) is running, i.e., when the wireless device is monitoring PDCCH, but no data is being scheduled, the energy consumption associated with PDCCH monitoring is a dominant contributor to the overall wireless device energy consumption.

One possible solution is to implement a sparser search space (SS) that may reduce the energy consumption, but a straightforward modification of the PDCCH SS (e.g., using RRC configuration) to reduce the duty cycle may not be an acceptable option since this may reduce the number of slots available for scheduling during an ongoing data burst, and thus may reduce the overall user throughput (UPT).

Therefore, there is thus a need for reducing PDCCH monitoring-related energy consumption during IAT without compromising data transmission during active data bursts. The instant disclosure solves at least a portion of the problem(s) with existing systems at least in part by allowing for a power savings mode in active time.

Before describing in detail exemplary embodiments, it is noted that the embodiments reside primarily in combinations of apparatus components and processing steps related to adaptation of channel monitoring by short discontinuous reception (DRX). Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device, etc.

Also, in some embodiments, the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments provide adaptation of channel monitoring by short discontinuous reception (DRX).

Figure 2:
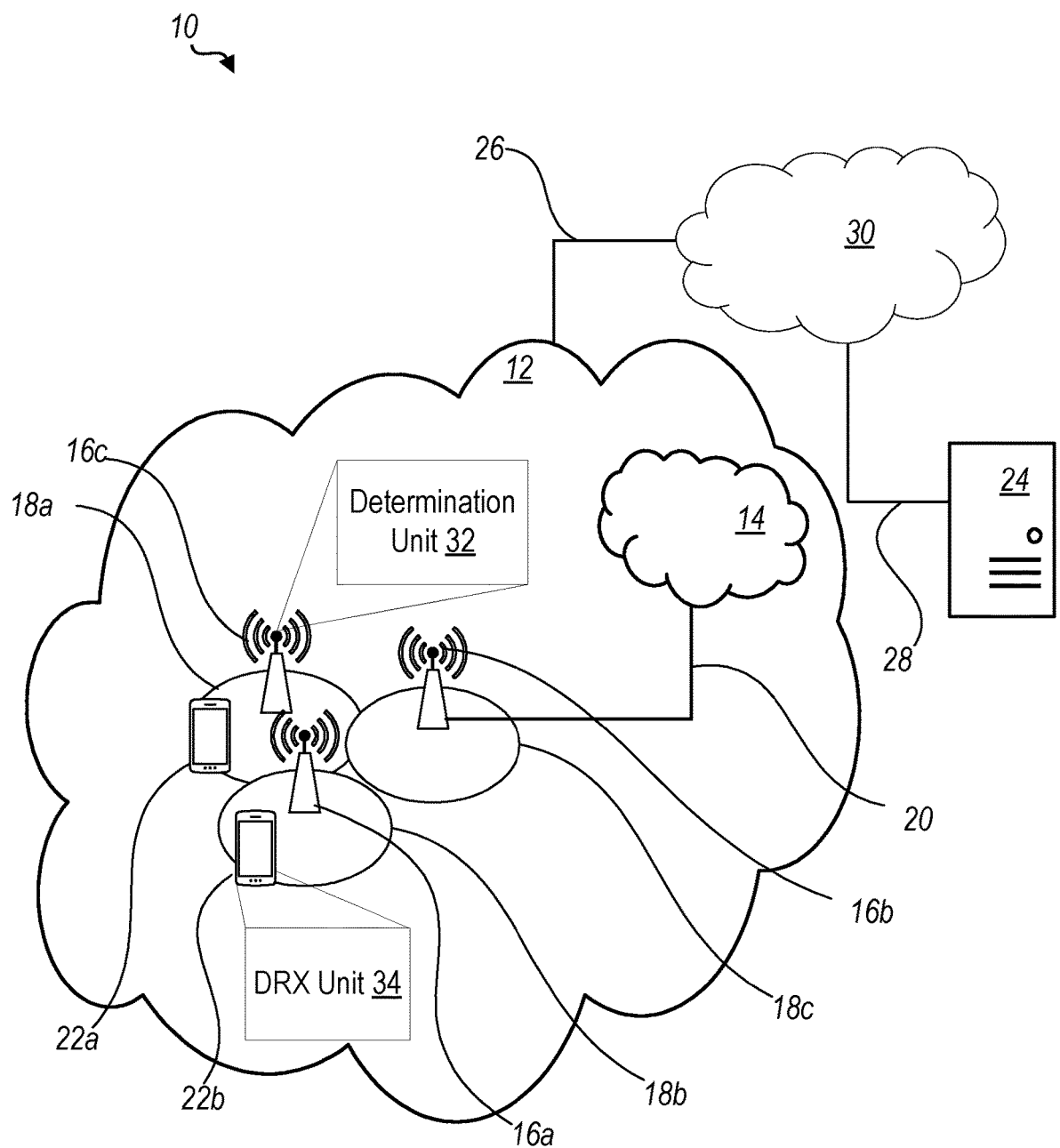
FIG. 2 is a schematic diagram of an exemplary network architecture illustrating a communication system connected via an intermediate network to a host computer according to the principles in the present disclosure.

Referring again to the drawing figures, in which like elements are referred to by like reference numerals, there is shown in FIG. 2 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16c. A second WD 22b in coverage area 18b is wirelessly connectable to the corresponding network node 16a. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 2 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22*a*. Similarly, the network node 16 need not be aware of the future routing of an outgoing uplink communication originating from the WD 22*a* towards the host computer 24.

A network node 16 is configured to include a determination unit 32 which is configured perform one or more network node functions described herein such as with respect to determining a short DRX configuration for wireless device 22, as described herein. A wireless device 22 is configured to include a DRX unit 34 which is configured to perform one or more functions described herein such as with respect to implementing a short DRX configuration, as described herein.

Example implementations, in accordance with an embodiment, of the WD 22, network node 16 and host computer 24 discussed in the preceding paragraphs will now be described with reference to FIG. 3. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22. The processing circuitry 42 of the host computer 24 may include an information unit 54 configured to enable the service provider to one or more of: transmit, receive, communicate, process, determine, forward, relay, store, etc. information related to the DRX configuration (e.g., short DRX configuration and/or long DRX configuration) that is described herein.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include determination unit 32 configured to perform one or more network node 16 functions described herein such as with respect to determining the short DRX configuration.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include a DRX unit 34 configured to perform one or more wireless device functions described herein such as with respect to short DRX configuration implementation.

Figure 3:
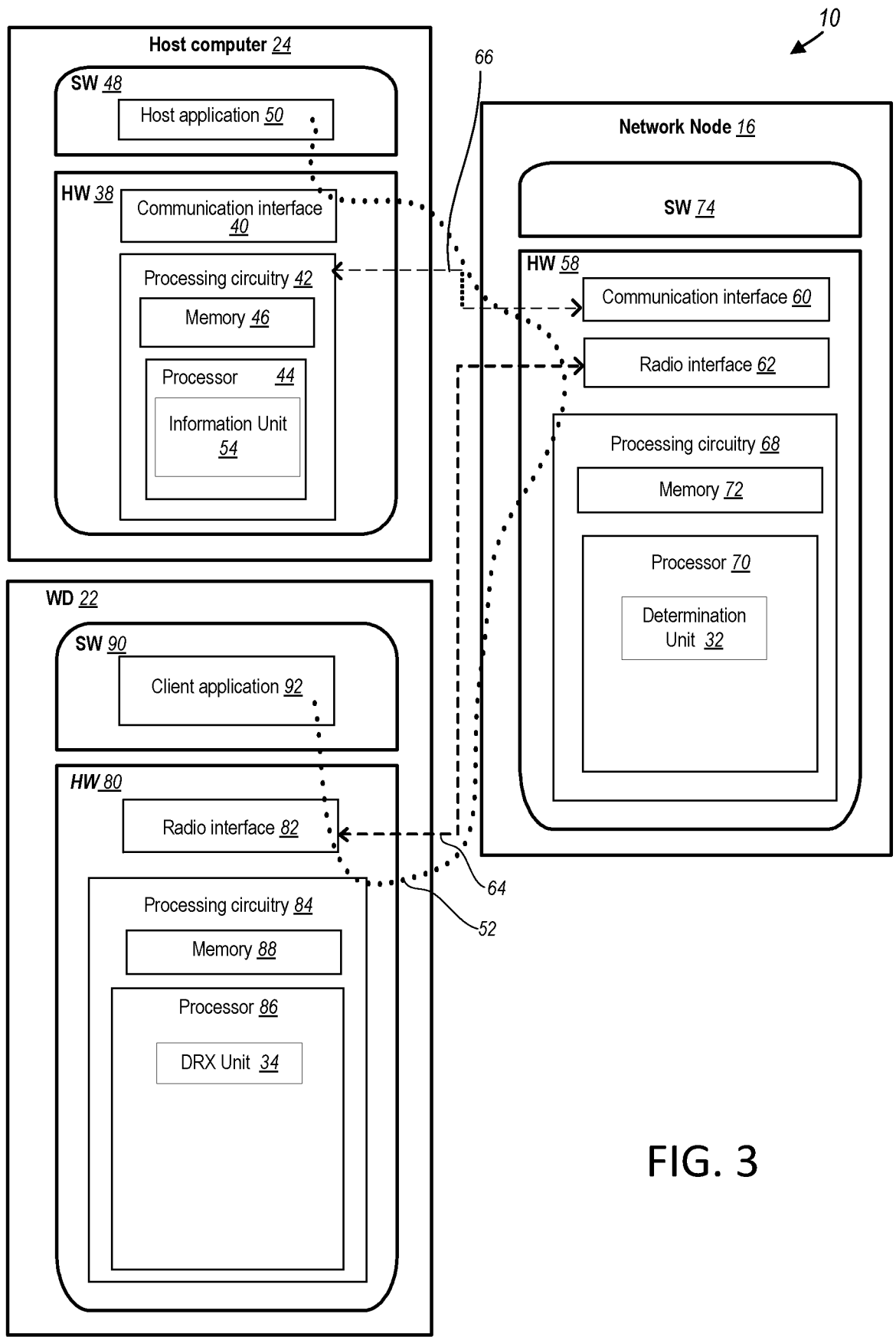
FIG. 3 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 3 and independently, the surrounding network topology may be that of FIG. 2.

In FIG. 3, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 2 and 3 show various "units" such as determination unit 32, and DRX unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

FIG. 4 is a flowchart illustrating an exemplary method implemented in a communication system, such as, for example, the communication system of FIGS. 2 and 3, in accordance with one embodiment. The communication system may include a host computer 24, a network node 16 and a WD 22, which may be those described with reference to FIG. 3. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

FIG. 5 is a flowchart illustrating an exemplary method implemented in a communication system, such as, for example, the communication system of FIG. 2, in accordance with one embodiment. The communication system may include a host computer 24, a network node 16 and a WD 22, which may be those described with reference to FIGS. 2 and 3. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

Figure 6:
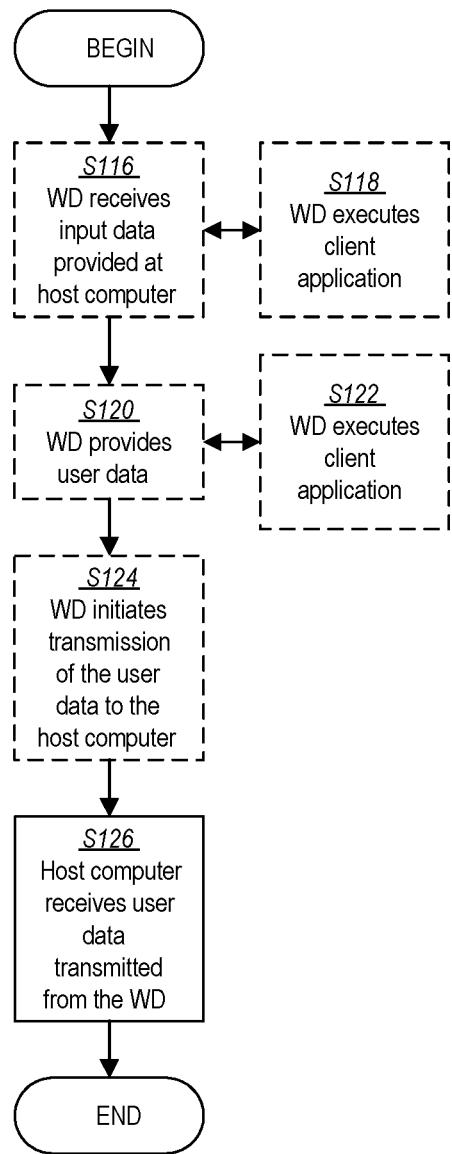
FIG. 6 is a flowchart illustrating exemplary methods implemented in a communication system including a host computer, a network node and a wireless device for receiving user data from the wireless device at a host computer according to some embodiments of the present disclosure.

FIG. 6 is a flowchart illustrating an exemplary method implemented in a communication system, such as, for example, the communication system of FIG. 2, in accordance with one embodiment. The communication system may include a host computer 24, a network node 16 and a WD 22, which may be those described with reference to FIGS. 2 and 3. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

Figure 7:
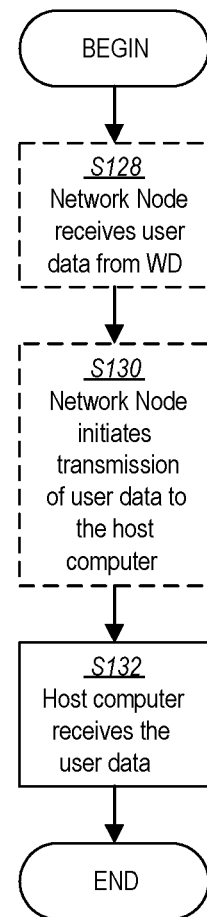
FIG. 7 is a flowchart illustrating exemplary methods implemented in a communication system including a host computer, a network node and a wireless device for receiving user data at a host computer according to some embodiments of the present disclosure.

FIG. 7 is a flowchart illustrating an exemplary method implemented in a communication system, such as, for example, the communication system of FIG. 2, in accordance with one embodiment. The communication system may include a host computer 24, a network node 16 and a WD 22, which may be those described with reference to FIGS. 2 and 3. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 8:
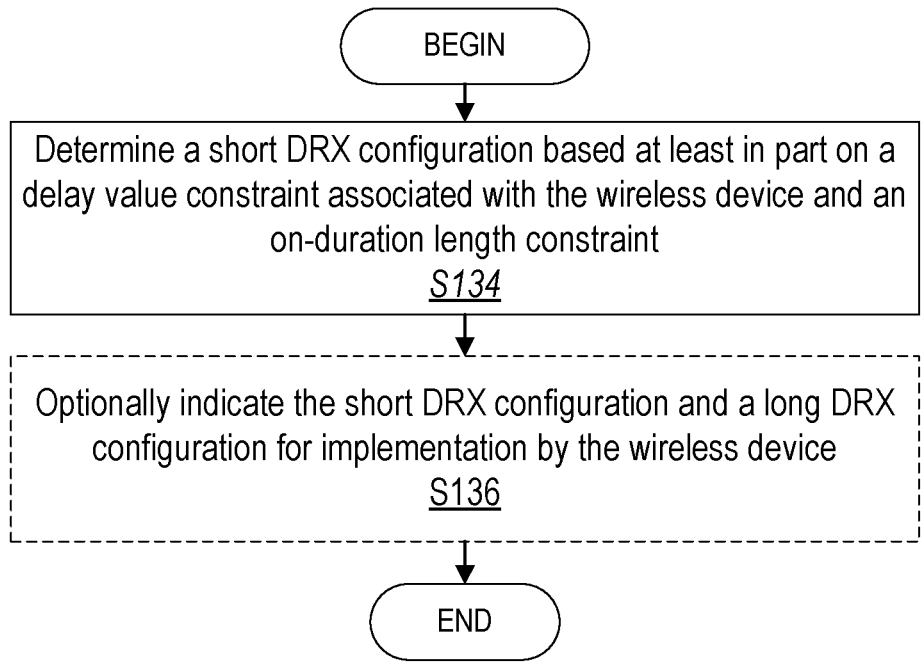
FIG. 8 is a flowchart of an exemplary process in a network node according to one or more embodiments of the disclosure.

FIG. 8 is a flowchart of an exemplary process in a network node 16 according to some embodiments of the disclosure. One or more Blocks and/or functions performed by network node 16 may be performed by one or more elements of network node 16 such as by determination unit 32 in processing circuitry 68, processor 70, radio interface 62, etc. In one or more embodiments, network node 16 such as via one or more of determination unit 32, processing circuitry 68, processor 70, communication interface 60 and radio interface 62 is configured to determine (Block S134) a short DRX configuration based at least in part on a delay value constraint associated with the wireless device and an on-duration length constraint, as described herein. In one or more embodiments, network node 16 such as via one or more of processing circuitry 68, processor 70, determination unit 32, communication interface 60 and radio interface 62 is configured to optionally indicate (Block S136) the short DRX configuration and a long DRX configuration for implementation by the wireless device, as described herein.

According to one or more embodiments, the long DRX configuration is configured to occur after a short DRX phase associated with the short DRX configuration. According to one or more embodiments, a downlink channel is not monitored during a short DRX phase associated with the short DRX configuration where the downlink channel is monitoring at least in between at least two short DRX phases associated with the short DRX configuration. According to one or more embodiments, the delay value constraint is based at least in part on a configuration of the wireless device, and an on-duration length constraint is selected based at least in part on at least one of a monitoring duty cycle and scheduling flexibility.

Figure 9:
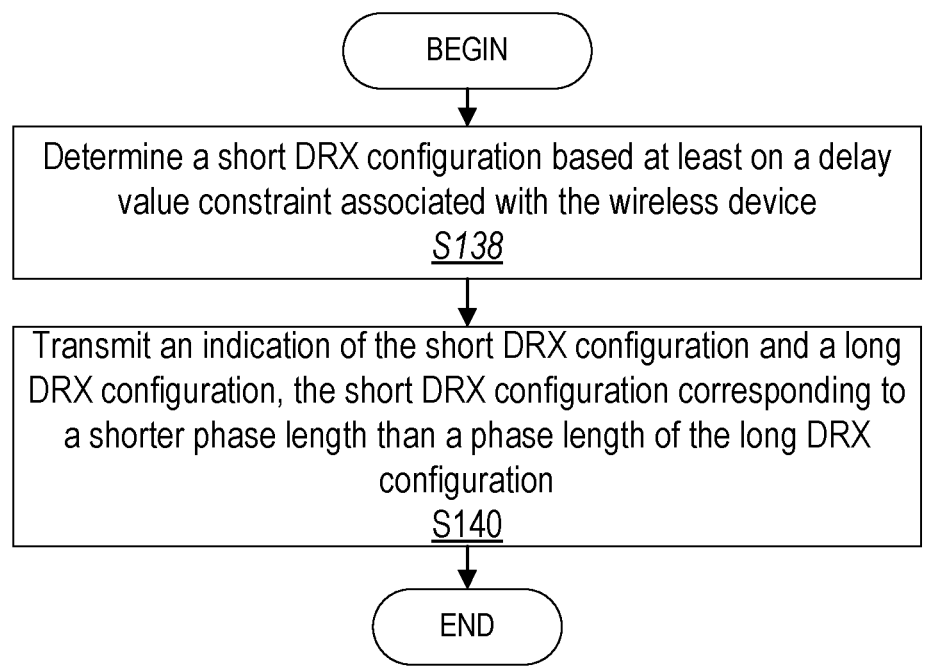
FIG. 9 is a flowchart of another exemplary process in a network node according to one or more embodiments of the disclosure.

FIG. 9 is a flowchart of another exemplary process in a network node 16 according to some embodiments of the disclosure. One or more Blocks and/or functions performed by network node 16 may be performed by one or more elements of network node 16 such as by determination unit 32 in processing circuitry 68, processor 70, radio interface 62, etc. In one or more embodiments, network node 16 such as via one or more of determination unit 32, processing circuitry 68, processor 70, communication interface 60 and radio interface 62 is configured to determine (Block S138) a short DRX configuration based at least on a delay value constraint associated with the wireless device, as described herein.

In one or more embodiments, network node 16 such as via one or more of determination unit 32, processing circuitry 68, processor 70, communication interface 60 and radio interface 62 is configured to transmit (Block S140) an indication of the short DRX configuration and a long DRX configuration where the short DRX configuration corresponds to a shorter cycle length than a cycle length of the long DRX configuration, as described herein.

According to one or more embodiments, the delay value constraint is based at least on capability signaling associated with the wireless device. According to one or more embodiments, the short DRX configuration is based at least on an on-duration length constraint where the on-duration length constraint is based on a capability signaling associated with the wireless device. According to one or more embodiments, the on-duration length constraint is based at least on one of a monitoring duty cycle and scheduling flexibility.

According to one or more embodiments, the short DRX configuration is configured to occur after a data burst and during an inactivity timer phase of the long DRX configuration. According to one or more embodiments, an on-duration length of the short DRX configuration is configured to correspond to an on-duration length of the long DRX configuration. According to one or more embodiments, an on-duration length of the short DRX configuration is configured to be shorter than an on-duration length of the long DRX configuration. According to one or more embodiments, the processing circuitry is further configured to: determine that the wireless device missed at least one physical downlink control channel scheduling; and retransmit physical downlink control channel scheduling in at least one on-duration of the short DRX configuration.

Figure 10:
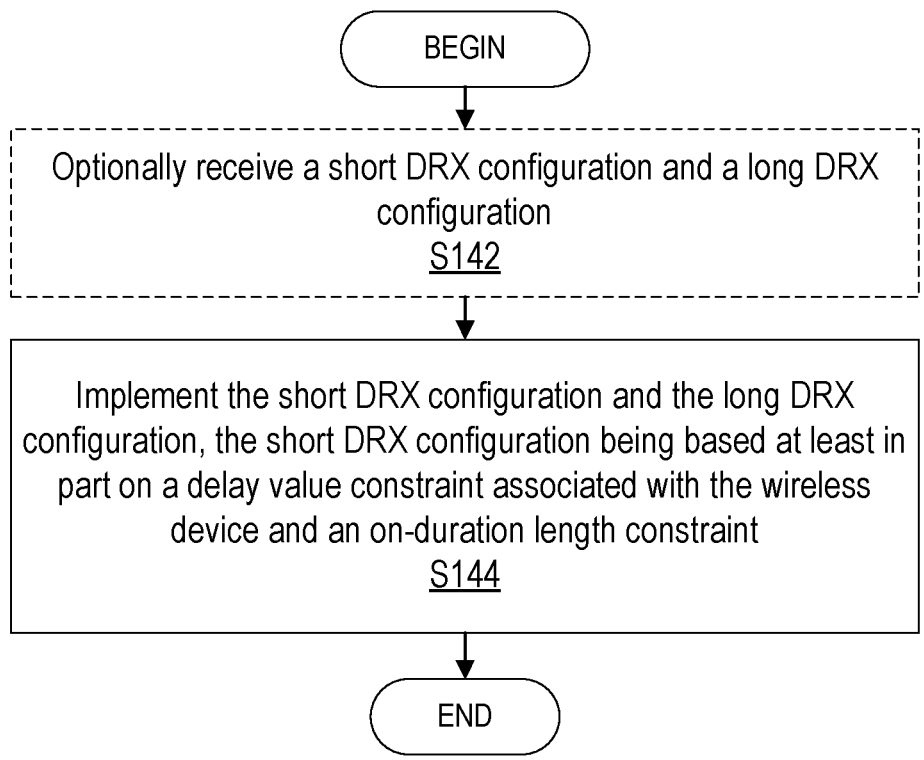
FIG. 10 is a flowchart of an exemplary process in a wireless device for according to one or more embodiments of the disclosure.

FIG. 10 is a flowchart of an exemplary process in a wireless device 22 according to some embodiments of the present disclosure. One or more Blocks and/or functions performed by wireless device 22 may be performed by one or more elements of wireless device 22 such as by DRX unit 34 in processing circuitry 84, processor 86, radio interface 82, etc. In one or more embodiments, wireless device such as via one or more of processing circuitry 84, processor 86 and radio interface 82 is configured to optionally receive (Block S142) a short DRX configuration and a long DRX configuration, as described herein. In one or more embodiments, wireless device such as via one or more of processing circuitry 84, processor 86 and radio interface 82 is configured to implement (Block S144) the short DRX configuration and the long DRX configuration where the short DRX configuration is based at least in part on a delay value constraint associated with the wireless device and an on-duration length constraint, as described herein.

According to one or more embodiments, the long DRX configuration is configured to occur after a short DRX phase associated with the short DRX configuration. According to one or more embodiments, a downlink channel is not monitored during a short DRX phase associated with the short DRX configuration where the downlink channel is monitoring at least in between at least two short DRX phases associated with the short DRX configuration. According to one or more embodiments, the delay value constraint is based at least in part on a configuration of the wireless device, and an on-duration length constraint is selected based at least in part on at least one of a monitoring duty cycle and scheduling flexibility.

Figure 11:
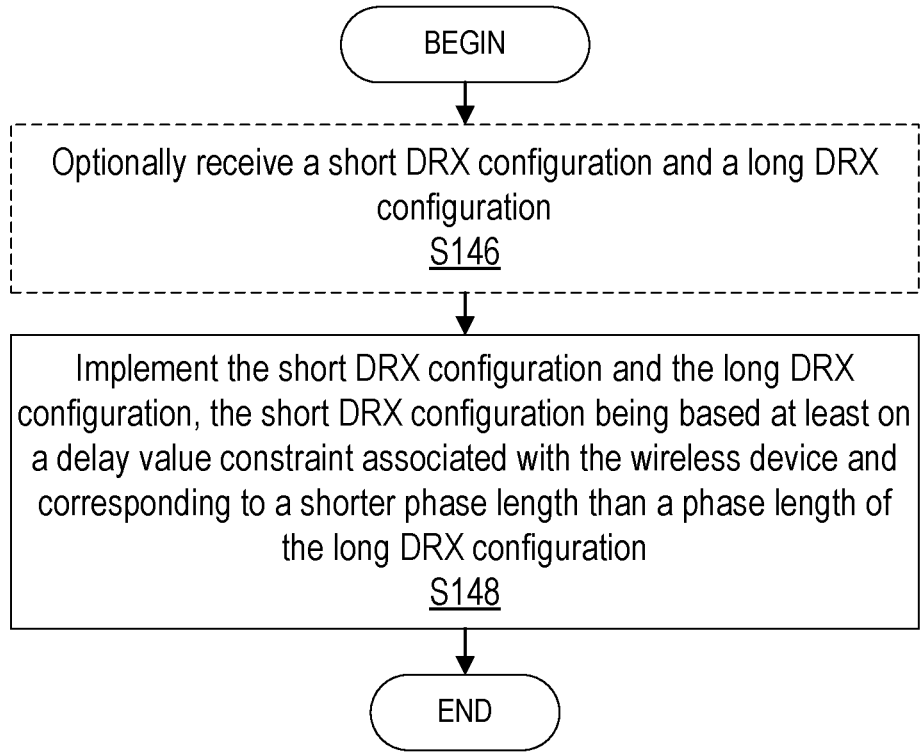
FIG. 11 is a flowchart of another exemplary process in a wireless device for according to one or more embodiments of the disclosure.

FIG. 11 is a flowchart of an exemplary process in a wireless device 22 according to some embodiments of the present disclosure. One or more Blocks and/or functions performed by wireless device 22 may be performed by one or more elements of wireless device 22 such as by DRX unit 34 in processing circuitry 84, processor 86, radio interface 82, etc. In one or more embodiments, wireless device such as via one or more of processing circuitry 84, processor 86 and radio interface 82 is configured to optionally receive (Block S146) a short DRX configuration and a long DRX configuration, as described herein. In one or more embodiments, wireless device such as via one or more of processing circuitry 84, processor 86 and radio interface 82 is configured to implement (Block S148) the short DRX configuration and the long DRX configuration where the short DRX configuration is based at least on a delay value constraint associated with the wireless device and corresponding to a shorter cycle length than a cycle length of the long DRX configuration, as described herein.

According to one or more embodiments, the delay value constraint is based at least on capability signaling associated with the wireless device. According to one or more embodiments, the short DRX configuration is based at least on an on-duration length constraint where the on-duration length constraint is based on a capability signaling associated with the wireless device. According to one or more embodiments, the on-duration length constraint is based at least on one of a monitoring duty cycle and scheduling flexibility.

According to one or more embodiments, the processing circuitry is further configured to cause transmission of capability signaling to the network node via radio resource control, RRC, signaling. According to one or more embodiments, a short DRX phase of the short DRX configuration is configured to occur after a data burst and during an inactivity timer phase of the long DRX configuration. According to one or more embodiments, an on-duration length of the short DRX configuration is configured to correspond to an on-duration length of the long DRX configuration.

According to one or more embodiments, an on-duration length of the short DRX configuration is configured to be shorter than an on-duration length of the long DRX configuration. According to one or more embodiments, the processing circuitry is further configured to: enter a short DRX phase of the short DRX configuration based at least on a missed physical downlink control channel scheduling; and receive a retransmission of a physical downlink control channel scheduling in at least one on-duration of the short DRX configuration.

Having described the general process flow of arrangements of the disclosure and having provided examples of hardware and software arrangements for implementing the processes and functions of the disclosure, the sections below provide details and examples of arrangements for adaptation of channel monitoring by short discontinuous reception (DRX).

Embodiments provide adaptation of channel monitoring by short discontinuous reception (DRX). As used herein, the time units are generally discussed in terms of slots or milliseconds interchangeably. Conversion between these time units may depend on the slot duration in the chosen numerology/subcarrier spacing.

The disclosure utilizes the short DRX component of the cDRX mechanism for scheduling PDCCH monitoring during the active time (i.e., during the running of the drx-inactivity timer (IAT)). In one or more embodiments, the general cDRX mechanism is at least in part defined in one or more wireless communication standards such as 3GPP Rel-15.

In one embodiment, the network node 16, such as via one or more of processing circuitry 68, processor 70, DRX unit 34, communication interface 60 and radio interface 62, configures wireless device 22 with short DRX at a small-time scale (or predefined time scale below a threshold) during the IAT phase of the long DRX-only configurations, i.e. the traditional/existing IAT phase is replaced by a short DRX phase. This replacement by a short DRX phase may be performed in addition to the conventional long DRX that is configured as usual or as known in the art. The short DRX (i.e., short DRX phase), to be activated between data bursts in active time, has a short period (e.g., "short periods" corresponds to a few ms), a short IAT from a last data slot (e.g., 0 or 1), and number of periods (or timer duration) before entering long DRX may be selected to be equal to the conventional IAT length, for example. The long DRX is configured with a long period (e.g., "long period" may corresponds to 100s of ms) and a release timer before transitioning to idle/inactive may be used as described in conventional or known cDRX.

Figure 12:
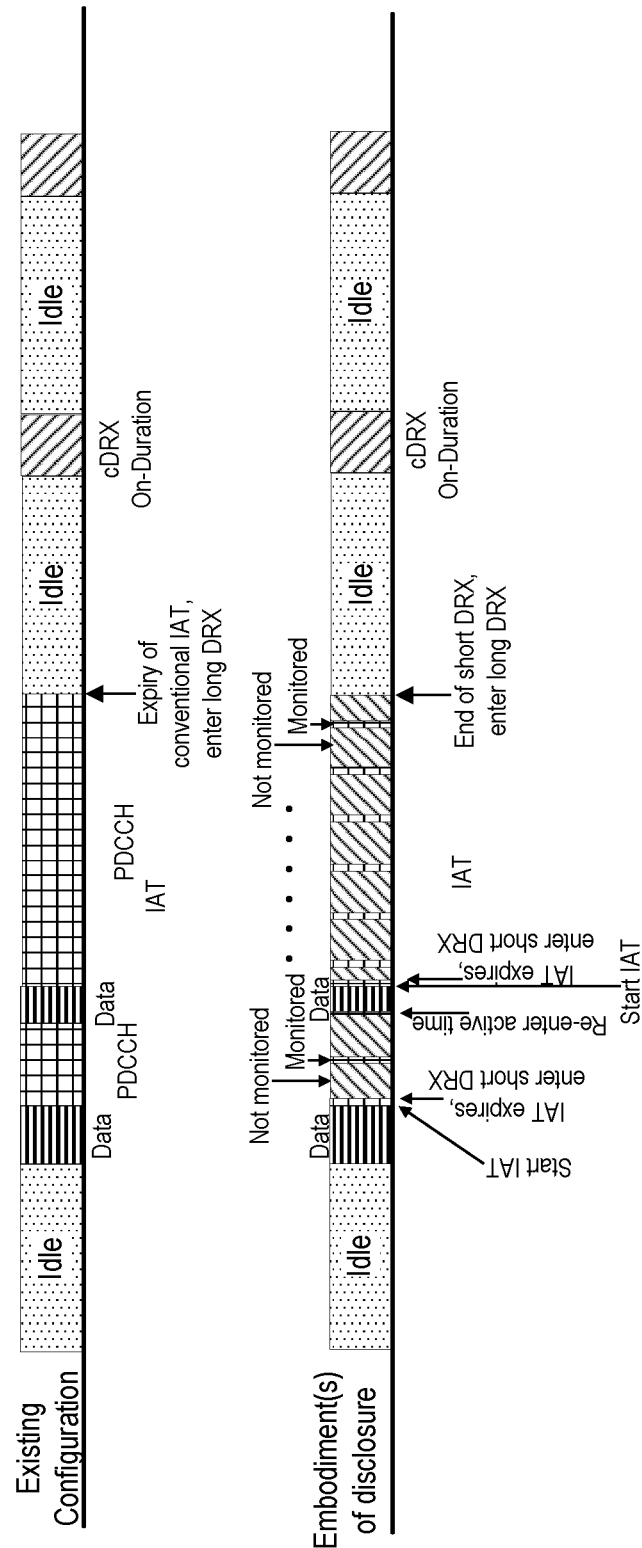
FIG. 12 is a block diagram comparing an existing configuration with a configuration of one or more embodiments of the disclosure.

An example PDCCH monitoring pattern according to the teaching of the disclosure compared to conventional IAT is illustrated in FIG. 12.

Figure 13:
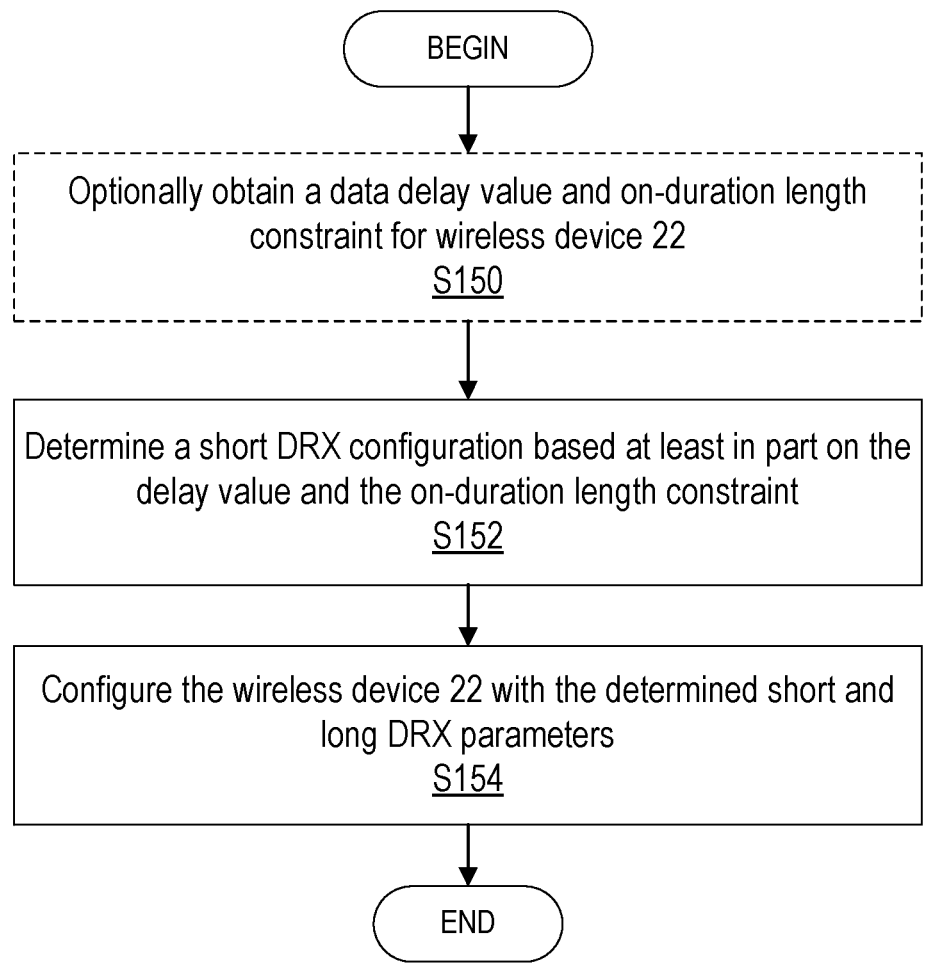
FIG. 13 is a flowchart of another exemplary process in a network node according to one or more embodiments of the disclosure.

FIG. 13 is a flow diagram of an example DRX process in accordance with one or more embodiments of the disclosure. In one or more embodiments, network node 16 such as via one or more of processing circuitry 68, processor 70, DRX unit 34, communication interface 60 and radio interface 62 is configured to optionally obtain (Block S150) a data delay value and on-duration length constraint for wireless device 22, as described herein. For example, the network node 16, such as via one or more of processing circuitry 68, processor 70, DRX unit 34, communication interface 60 and radio interface 62, may obtain an acceptable data delay value from or for the wireless device 22. The wireless device 22 may optionally signal the acceptable data delay for next data burst via wireless device 22 assistance signaling e.g., through RRC signaling. Alternatively, or additionally, the network node 16 may use the knowledge of one or more of current traffic types (e.g., QoS), DL/UL buffer, etc. to determine the possible delays, e.g. by looking at the scheduling gaps. In one or more embodiments, "acceptable delay value" may corresponds to a value that meets a predefined performance threshold at the wireless devices 22 such as throughput performance.

The network node 16, such as via one or more of processing circuitry 68, processor 70, DRX unit 34, communication interface 60 and radio interface 62, may obtain the on-duration length constraint based at least in part on the wireless device's supported 3GPP release version (such as from wireless device 22 capability signaling via RRC). For example, if the wireless device 22 is a 3GPP Rel-15 wireless device 22, the short DRX on-duration length may not be configurable independently and the constraint may be defined by the shortest acceptable long DRX on-duration length. The latter generally cannot be made too short (i.e., may not be set to below a predefined threshold value), since the scheduling flexibility of individual wireless devices may be negatively affected. For example, if the long DRX on-duration length is one slot (e.g., one example value for short DRX configuration in one or more embodiments of the disclosure), the network node 16, such as via one or more of processing circuitry 68, processor 70, DRX unit 34, communication interface 60 and radio interface 62, may schedule any data transmission in long DRX to start during that exact slot, which may limit how many wireless devices 22 sharing an on-duration may be scheduled concurrently. One possible method around such a limitation may be to send PDCCH, e.g., over Common Search Space CSS, to multiple wireless devices 22 and activate the IAT.

In one or more embodiments, network node 16 such as via one or more of processing circuitry 68, processor 70, DRX unit 34, communication interface 60 and radio interface 62 is configured to determine (Block S152) a short DRX configuration based at least in part on the delay value and the on-duration length constraint. The delay value corresponds to an acceptable delay value that may be obtained as described in Block S142.

Additionally, the IAT length may be considered for determining the short DRX configuration. The off-duration length of the short DRX may be limited based at least in part on acceptable data delay, which may have negative effects if exceeded. The on-duration length is selected/determined such that the length constraint is not exceeded and such that a low duty cycle that provides wireless device 22 PS gains is achieved. Furthermore, the network node 16, such as via one or more of processing circuitry 68, processor 70, DRX unit 34, communication interface 60 and radio interface 62, can consider pre-configured periodic measurements (e.g., periodic channel state information-reference signal (CSI-RS), or sounding reference signal (SRS) transmission) while determining the OFF duration. In one approach, the network node 16, such as via one or more of processing circuitry 68, processor 70, DRX unit 34, communication interface 60 and radio interface 62, can select/determine the short DRX ON duration such that it falls over the one or more measurement periods and thus the wireless device 22 may already be awake or in the ON state.

In some wireless communication standards such as NR Rel-15, the on-durations of the short and long DRX may have equal lengths, i.e., time lengths. The on-duration length (or "compromise value" in one or more examples) may be selected to be short enough to allow a low monitoring duty cycle in short DRX, given the wireless device 22's acceptable data delay, and long enough to allow scheduling flexibility during long DRX on-durations. In one or more embodiments, relative terms such as "low", "long enough", etc. may be associated with one or more predefined thresholds and/or values.

In one or more embodiments, if a comprise value (i.e., value of on-duration length) that allows for a low monitoring duty cycle and scheduling flexibility as described above is not available, the network node 16, such as via one or more of processing circuitry 68, processor 70, DRX unit 34, communication interface 60 and radio interface 62, may determine not to configure the wireless device 22 with short DRX.

Additional Embodiments

For power saving purposes, the wireless device 22, such as via one or more of processing circuitry 84, processor 86, DRX unit 34 and radio interface 82, may implement a wake-up signal (WUS) during DRX operation. In cases where the wireless device 22 implements WUS in the short DRX, the total length of the short DRX cycle and WUS-offset may be configured to not exceed the acceptable data delay.

The cDRX related parameters in the following examples may be configured, such as via one or more of processing circuitry 68, processor 70, determination unit 32, communication interface 60 and radio interface 62, via RRC through the "DRX-Config" information element (IE). In one or more embodiments, the actual RRC configuration time units may be in number/quantity of milliseconds, but in one or more examples, the term slot is used below where a slot is 1 ms in a 15 kHz subcarrier spacing configuration.

An example cDRX configuration in one or more embodiments may be as follows, assuming that the on-duration length is at least 6 slots, acceptable data delay is 8 slots, and baseline IAT is 100 ms (200 slots):

IAT (3GPP term drx-InactivityTimer) 1 slot
On-duration length (3GPP term drx-onDurationTimer) 6 slots
Short DRX period (3GPP term drx-ShortCycle) 14 slots
Length of short DRX phase (3GPP term drx-ShortCycleTimer) 14 periods
Long DRX period (3GPP term drx-LongCycleStartOffset) unchanged
Release timer unchanged Different embodiments may be applied in other scenarios. In one or more embodiments, short and long on-durations may be selected/determined independently, e.g., by adding separate parameters for on-duration lengths in short and long DRX (e.g., shortDrx-drx-onDurationTimer and longDrx-drx-onDurationTimer instead of a single drx-onDurationTimer). In that case, the short DRX on-duration length may be selected/determined to be shorter, as short as one slot or 2-4 slots for example, in order to allow for shortest possible periods with a low duty cycle. The selected and/or determination of the short DRX on-duration length may be based at least in part on one or more of: the acceptable period (i.e., latency for new data burst), the resulting monitoring duty cycle (i.e., duty cycle above 50% that may provide limited PS gains), and a required scheduling flexibility in the short DRX on-durations. In one or more embodiments, the number of wireless devices 22 potentially scheduled in the same short DRX on-duration is lower than for a number of wireless devices 22 potentially scheduled for the long DRX on-durations such as due to the shorter period where multiple wireless devices 22 may still need to be accommodated. Furthermore, failing to schedule a wireless device 22 in the closest (e.g., first or next) on-duration may lead to violating the wireless device 22's acceptable delay value. Therefore, in one or more embodiments, it may be desirable to configure a short DRX on-duration length higher or greater than 1 slot.

An example configuration could then be:
IAT 1 slot
Short DRX on-duration length 2 slots
Short DRX period 10 slots
Length of short DRX phase 20 periods
Long DRX on-duration length unchanged
Long DRX period unchanged
Release timer unchanged In Block S154, the network node 16 such as via one or more of processing circuitry 68, processor 70, determination unit 32, communication interface 60 and radio interface 62 is configured to configure the wireless device 22 with the determined short and long DRX parameters. In one or more embodiments, the short DRX may not be configured if an appropriate configuration is not possible due to on-duration constraints, as described herein.

Further, for power saving purpose, the wireless device 22 may implement a wake-up signal (WUS). A drawback of the WUS is the additional latency which may be equal to the total length of the DRX cycle and the WUS offset. On the other hand, the latency inside the conventional IAT phase is relatively short. In addition, since it may be desirable to have a relatively short period of ON duration in the short-DRX cycle, the power saving of WUS in the short DRX may be limited. As such, the wireless device 22 and the network node 16 may employ the WUS, for example, only for the long-DRX cycle. Alternatively, the wireless device 22 and the network node 16 can activate the WUS independently for the long-DRX and the short-DRX cycle phases.

Network Node 16—Wireless Device 22 Misalignment Issues

For example, if the wireless device 22 misses a potential scheduling PDCCH message within the ON duration or IAT, the wireless device 22, such as via one or more of processing circuitry 84, processor 86, DRX unit 34 and radio interface 82, may enter short-DRX OFF duration and thereby may miss some additional PDCCH messages. This situation may lead to a high communication cost for both the network node 16 and the wireless device 22, as missing a number of PDCCH messages can potentially lead to declaring radio link failure (RLF). To address this situation and issue, in one or more embodiments, the network node 16, such as via one or more of processing circuitry 68, processor 70, determination unit 32, communication interface 60 and radio interface 62, can retransmit the scheduling PDCCH message in one or more ON durations before declaring RLF. Alternatively, the wireless device 22 can determine to remain active despite an expiring short DRX ON duration or IAT timer if the wireless devices 22, such as via one or more of processing circuitry 84, processor 86, DRX unit 34 and radio interface 82, determines that it probably has missed a scheduling PDCCH message. For example, wireless device 22, such as via one or more of processing circuitry 84, processor 86, DRX unit 34 and radio interface 82, may determine it probably has missed a scheduling PDCCH message if the wireless device 22 determines that the channel conditions have deteriorated or changed rapidly such that the wireless device 22 may determine to remain awake or in an ON state, and may possibly employ more powerful/robust reception techniques to help ensure the wireless device 22 is not missing a scheduling PDCCH message. In another approach, the wireless device 22, such as via one or more of processing circuitry 84, processor 86, DRX unit 34 and radio interface 82, sends an UL SR (scheduling request) in a number of ON durations, to indicate to the network node 16 that it is connected and thus avoid RFL being declared.

From the wireless device 22 perspective, in response to the configuration above, the wireless device 22, such as via one or more of processing circuitry 84, processor 86, DRX unit 34 and radio interface 82, may enter a sleep mode (e.g., micro, light, deep) depending on the short DRX-OFF duration and wireless device 22 implementation of the sleep modes, and thus lower the wireless device 22 power consumption. For example, in one or more embodiments, if the OFF duration is around 5 ms, then the wireless device 22, such as via one or more of processing circuitry 84, processor 86, DRX unit 34 and radio interface 82, can enter "light sleep" by turning OFF its circuitry, or if the OFF duration is around 1 or 2 ms, the wireless device 22, such as via one or more of processing circuitry 84, processor 86, DRX unit 34 and radio interface 82, may determine to only to turn off its RF circuitry (e.g., radio interface 82) by going to "micro sleep". "Deep sleep" may correspond to the wireless device 22, such as via one or more of processing circuitry 84, processor 86, DRX unit 34 and radio interface 82, turning off one or more component/circuitry for a longer period of time than in "light sleep."

As described herein, in 3GPP Rel 15, the short and long DRX ON duration have the same length, nevertheless, if the network node 16, such as via one or more of processing circuitry 68, processor 70, determination unit 32, communication interface 60 and radio interface 62, determines to shorten this duration, the network node 16, such as via one or more of processing circuitry 68, processor 70, determination unit 32, communication interface 60 and radio interface 62, can use a MAC DRX command and send the wireless device 22 directly to short-DRX OFF duration. Furthermore, one or more embodiments described herein may be combined with any possible power saving signal. For example, if a PDCCH skipping signal is developed, then the PDCCH skipping signal can be used instead of a MAC DRX command to indicate to the wireless device 22 to skip a number of PDCCH occasions. If the length is equal to or longer than the remainder of ON duration (IAT), the wireless device 22 can directly move to short/long-DRX OFF duration depending on the wireless device 22's configuration. Alternatively, if the network node 16, such as via one or more of processing circuitry 68, processor 70, determination unit 32, communication interface 60 and radio interface 62, determines to keep the wireless device 22 awake (e.g., if the network node 16 determines eminent data is to be scheduled), the network node 16, such as via one or more of processing circuitry 68, processor 70, determination unit 32, communication interface 60 and radio interface 62, can either send an earlier scheduling PDCCH message, or send a different PDCCH message, e.g., an aperiodic CSI-RS report, or an aperiodic SRS, and so on just before the wireless device 22 enters the OFF duration. The wireless device 22 can also send a SR in case it has some eminent data for UL transmission or expects data to be received in the downlink. As such, the wireless device 22 may remain in active mode skipping the upcoming OFF duration

SOME EXAMPLES

Example 1

Method for data transmission in a network node 16, comprising
obtaining an acceptable data delay value and on-duration length constraint for a wireless device 22,
determining a short DRX configuration based on the acceptable delay value and the on-duration length constraint,
based on the determining, configuring the UE (i.e., WD 22) with short and long DRX.

Example 2

Example 1 where the short DRX is not configured if a configuration satisfying the constraint is not found.

Example 3

Example 1 where the determining comprises ensuring sufficiently low PDCCH monitoring duty cycle during short DRX and sufficiently long on-duration to avoid scheduling limitations during long DRX.

Embodiment A1

A network node 16 configured to communicate with a wireless device 22, the network node 16 configured to, and/or comprising a radio interface 62 and/or comprising processing circuitry 68 configured to:
determine a short DRX configuration based at least in part on a delay value constraint associated with the wireless device and an on-duration length constraint;
optionally indicate the short DRX configuration and a long DRX configuration for implementation by the wireless device 22.

Embodiment A2

The network node 16 of Embodiment A1, wherein the long DRX configuration is configured to occur after a short DRX phase associated with the short DRX configuration.

Embodiment A3

The network node 16 of Embodiment A1, wherein a downlink channel is not monitored during a short DRX phase associated with the short DRX configuration; and
the downlink channel being monitoring at least in between at least two short DRX phases associated with the short DRX configuration.

Embodiment A4

The network node 16 of Embodiment A1, wherein the delay value constraint is based at least in part on a configuration of the wireless device 22; and
on-duration length constraint being selected based at least in part on at least one of a monitoring duty cycle and scheduling flexibility.

Embodiment B1

A method implemented in a network node 16 configured to communicate with a wireless device 22, the method comprising:
determining a short DRX configuration based at least in part on a delay value constraint associated with the wireless device 22 and an on-duration length constraint; and
optionally indicating the short DRX configuration and a long DRX configuration for implementation by the wireless device 22.

Embodiment B2

The method of Embodiment B1, wherein the long DRX configuration is configured to occur after a short DRX phase associated with the short DRX configuration.

Embodiment B3

The method of Embodiment B1, wherein a downlink channel is not monitored during a short DRX phase associated with the short DRX configuration; and
the downlink channel being monitoring at least in between at least two short DRX phases associated with the short DRX configuration.

Embodiment B4

The method of Embodiment B1, wherein the delay value constraint is based at least in part on a configuration of the wireless device 22; and
    on-duration length constraint being selected based at least in part on at least one of a monitoring duty cycle and scheduling flexibility.

Embodiment C1

A wireless device 22 configured to communicate with a network node 16, the wireless device 22 configured to, and/or comprising a radio interface 82 and/or processing circuitry 84 configured to:
    optionally receive a short DRX configuration and a long DRX configuration; and
    implement the short DRX configuration and the long DRX configuration, the short DRX configuration being based at least in part on a delay value constraint associated with the wireless device 22 and an on-duration length constraint.

Embodiment C2

The wireless device 22 of Embodiment C1, wherein the long DRX configuration is configured to occur after a short DRX phase associated with the short DRX configuration.

Embodiment C3

The wireless device 22 of Embodiment C1, wherein a downlink channel is not monitored during a short DRX phase associated with the short DRX configuration; and
    the downlink channel being monitoring at least in between at least two short DRX phases associated with the short DRX configuration.

Embodiment C4

The wireless device 22 of Embodiment C1, wherein the delay value constraint is based at least in part on a configuration of the wireless device 22; and
    on-duration length constraint being selected based at least in part on at least one of a monitoring duty cycle and scheduling flexibility.

Embodiment D1

A method implemented in a wireless device 22 that is configured to communicate with a network node 16, the method comprising:
    optionally receiving a short DRX configuration and a long DRX configuration; and
    implementing the short DRX configuration and the long DRX configuration, the short DRX configuration being based at least in part on a delay value constraint associated with the wireless device 22 and an on-duration length constraint.

Embodiment D2

The method of Embodiment D1, wherein the long DRX configuration is configured to occur after a short DRX phase associated with the short DRX configuration.

Embodiment D3

The method of Embodiment D1, wherein a downlink channel is not monitored during a short DRX phase associated with the short DRX configuration; and
    the downlink channel being monitoring at least in between at least two short DRX phases associated with the short DRX configuration.

Embodiment D4

The method of Embodiment D1, wherein the delay value constraint is based at least in part on a configuration of the wireless device 22; and
    on-duration length constraint being selected based at least in part on at least one of a monitoring duty cycle and scheduling flexibility.

Therefore, the disclosure advantageously enables wireless device 22 Power Saving (PS) in active time (i.e., the phase viewed as active time in long DRX) in the absence of scheduled data without negatively compromising data transmission capacity and throughput during data transmission intervals. In one or more embodiments, this is achieved by shortening the IAT and using the short DRX which provides the power savings. The throughput is not compromised by utilizing the short DRX since the short DRX allows the wireless device to wake-up and monitor any incoming traffic.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A network node configured to communicate with a wireless device, the network node comprising:
processing circuitry configured to:
determine a short DRX discontinuous reception (DRX) configuration based at least on a delay value constraint associated with the wireless device, the delay value constraint being a data delay for a next burst and corresponding to a value that meets a predefined performance threshold at the wireless device; and
transmit an indication of the short DRX configuration and a long DRX configuration, the short DRX configuration corresponding to a shorter cycle length than a cycle length of the long DRX configuration.

2. The network node of claim 1, wherein the delay value constraint is based at least on at least one of:
capability signaling associated with the wireless device;
traffic type;
downlink/uplink buffer; and
delay in signaling.

3. The network node of claim 1, wherein the short DRX configuration is based at least on an on-duration length constraint, the on-duration length constraint being based on a capability signaling associated with the wireless device.

4. The network node of claim 3, wherein the on-duration length constraint is based at least on one of a monitoring duty cycle and scheduling flexibility.

5. The network node of claim 1, wherein the short DRX configuration is configured to occur after a data burst and during an inactivity timer phase of the long DRX configuration.

6. The network node of claim 1, wherein an on-duration length of the short DRX configuration is configured to correspond to an on-duration length of the long DRX configuration, the short DRX configuration resulting in sparce monitoring compared to the long DRX configuration.

7. The network node of claim 1, wherein an on-duration length of the short DRX configuration is configured to be shorter than an on-duration length of the long DRX configuration.

8. The network node of claim 1, wherein an inactivity time for the short DRX configuration is shorter than an inactivity time for the long DRX configuration.

9. The network node of claim 1, wherein the processing circuitry is further configured to:
determine that the wireless device missed at least one physical downlink control channel scheduling; and
retransmit physical downlink control channel scheduling in at least one on-duration of the short DRX configuration.

10. A wireless device that is configured to communicate with a network node, the wireless device comprising:
processing circuitry configured to:
receive a short DRX discontinuous reception (DRX) configuration and a long DRX configuration; and
implement the short DRX configuration and the long DRX configuration, the short DRX configuration being based at least on a delay value constraint associated with the wireless device and corresponding to a shorter cycle length than a cycle length of the long DRX configuration, the delay value constraint being a data delay for a next burst and corresponding to a value that meets a predefined performance threshold at the wireless device.

11. The wireless device of claim 10, wherein the delay value constraint is based at least on at least one of:
capability signaling associated with the wireless device;
traffic type;
downlink/uplink buffer; and
delay in signaling.

12. The wireless device of claim 10, wherein the short DRX configuration is based at least on an on-duration length constraint, the on-duration length constraint being based on a capability signaling associated with the wireless device.

13. The wireless device of claim 12, wherein the on-duration length constraint is based at least on one of a monitoring duty cycle and scheduling flexibility.

14. The wireless device of claim 10, wherein the processing circuitry is further configured to cause transmission of one of:
- capability signaling to the network node via radio resource control, RRC, signaling;
- assistance information related to ongoing one of traffic and services.

15. The wireless device of claim 10, wherein a short DRX phase of the short DRX configuration is configured to occur after a data burst and during an inactivity timer phase of the long DRX configuration.

16. The wireless device of claim 10, wherein an on-duration length of the short DRX configuration is configured to correspond to an on-duration length of the long DRX configuration, the short DRX configuration resulting in sparce monitoring compared to the long DRX configuration.

17. The wireless device of claim 10, wherein an on-duration length of the short DRX configuration is configured to be shorter than an on-duration length of the long DRX configuration.

18. The wireless device of claim 10, wherein an inactivity time for the short DRX configuration is shorter than an inactivity time for the long DRX configuration.

19. The wireless device of claim 10, wherein the processing circuitry is further configured to:
- enter a short DRX phase of the short DRX configuration based at least on a missed physical downlink control channel scheduling; and
- receive a retransmission of a physical downlink control channel scheduling in at least one on-duration of the short DRX configuration.

20. A method implemented by a network node that is configured to communicate with a wireless device, the method comprising:
- determining a short DRX discontinuous reception (DRX) configuration based at least on a delay value constraint associated with the wireless device, the delay value constraint being a data delay for a next burst and corresponding to a value that meets a predefined performance threshold at the wireless device; and
- transmitting an indication of the short DRX configuration and a long DRX configuration, the short DRX configuration corresponding to a shorter cycle length than a cycle length of the long DRX configuration.

21. A method implemented by a wireless device that is configured to communicate with a network node, the method comprising:
- receiving a short DRX discontinuous reception (DRX) configuration and a long DRX configuration; and
- implementing the short DRX configuration and the long DRX configuration, the short DRX configuration being based at least on a delay value constraint associated with the wireless device and corresponding to a shorter cycle length than a cycle length of the long DRX configuration, the delay value constraint being a data delay for a next burst and corresponding to a value that meets a predefined performance threshold at the wireless device.

* * * * *